US008044367B2

(12) United States Patent
Yoshikawa et al.

(10) Patent No.: US 8,044,367 B2
(45) Date of Patent: Oct. 25, 2011

(54) SCINTILLATOR FOR NEUTRON DETECTION AND NEUTRON DETECTOR (75) Inventors: Akira Yoshikawa, Sendai (JP); Takayuki Yanagida, Sendai (JP); Kentaro Fukuda, Shunan (JP); Sumito Ishizu, Shunan (JP); Noriaki Kawaguchi, Shunan (JP); Toshihisa Suyama, Shunan (JP)

(73) Assignees: Tokuyams Corporation, Shunan-shi (JP); Tohoku University, Sendai-shi (JP)

( * ) Notice: Subject to any disclaimer, the term of this patent is extended or adjusted under 35 U.S.C. 154(b) by 0 days.

(21) Appl. No.: 12/866,863

(22) PCT Filed: Mar. 17, 2009

(86) PCT No.: PCT/JP2009/055122
§ 371 (c)(1),
(2), (4) Date: Aug. 9, 2010

(87) PCT Pub. No.: WO2009/119378
PCT Pub. Date: Oct. 1, 2009

(65) Prior Publication Data
US 2010/0314550 A1 Dec. 16, 2010

(30) Foreign Application Priority Data

Mar. 24, 2008 (JP) .................................. 2008-075323

(51) Int. Cl.
*G01T 3/06* (2006.01)
(52) U.S. Cl. ................................................. 250/390.11
(58) Field of Classification Search . 250/390.01–390.12
See application file for complete search history.

(56) References Cited

U.S. PATENT DOCUMENTS

| | | | |
|---|---|---|---|
| 7,095,029 B2 | 8/2006 | Katagiri | |
| 2002/0141529 A1* | 10/2002 | Olsher et al. | 376/245 |
| 2006/0033025 A1 | 2/2006 | Ichinose et al. | |
| 2007/0045555 A1 | 3/2007 | Fu | |

FOREIGN PATENT DOCUMENTS

| | | | |
|---|---|---|---|
| JP | 2002-221578 A | | 8/2002 |
| JP | 2003-248061 A | | 9/2003 |
| JP | 2006-234773 A | | 9/2006 |
| JP | 2007045869 A | * | 2/2007 |
| JP | 2007-63065 A | | 3/2007 |
| JP | 2007-70496 A | | 3/2007 |
| WO | WO 2004/086089 A1 | | 10/2004 |

OTHER PUBLICATIONS

M.J. Knitel et al., "LiBaF3, a thermal neutron scintillator with optimal n-gamma discrimination", Nuclear Instruments and Methods in Physics Research A 374 (1996) pp. 197-201.

(Continued)

*Primary Examiner* — Kiho Kim
(74) *Attorney, Agent, or Firm* — Birch, Stewart, Kolasch & Birch, LLP (57) ABSTRACT

A scintillator for neutron detection, comprising a metal fluoride crystal containing, as constituent elements, a metal having a valence of 2 or higher, such as calcium, aluminum or yttrium; lithium; and fluorine, the metal fluoride crystal containing 1.1 to 20 atoms per unit volume (atoms/nm$^3$) of $^6$Li, having an effective atomic number of 10 to 40, containing a lanthanoid such as cerium, praseodymium or europium, and being represented by, for instance, LiCaAlF$_6$, LiSrAlF$_6$ and LiYF$_4$. The scintillator for neutron detection has high sensitivity to neutron rays, and is reduced in a background noise attributed to γ rays.

7 Claims, 2 Drawing Sheets

OTHER PUBLICATIONS

International Search Report dated May 19, 2009 in International Application No. PCT/JP2009/055122.

Kentaro Fukuda et al., "Growth and Characterization of Ce doped LiCaAlF6 Crystals for Scintillator Application", Abstracts of Lectures at the 66th Congress of the Japan Society of Applied Physics, No. 1, 211 (2005).

Kiyoshi Shimamura et al., "Growth of Ce-doped LiCaAlF6 and LiSrAlF6 single crystals by the Czochralski technique under CF4 atmosphere", Journal of Crystal Growth 211, (2000) pp. 302-307.

Syed Naeem Ahmed, "Physics and Engineering of Radiation Detection", American Press Inc. (2007) pp. 312-313 and 350-353.

* cited by examiner

Fig. 4

SCINTILLATOR FOR NEUTRON DETECTION AND NEUTRON DETECTOR

TECHNICAL FIELD

This invention relates to a scintillator for neutron detection which is used for detecting neutrons. More particularly, the invention relates to a scintillator for neutron detection which is composed of a metal fluoride crystal containing a lanthanoid.

BACKGROUND ART

A scintillator is a substance which, when hit by radiation such as α rays, β rays, γ rays, X-rays, or neutron rays, absorbs the radiation to emit fluorescence. The scintillator is used for radiation detection in combination with a photodetector, such as a photomultiplier tube, and has wide varieties of application fields such as the medical field, for example, tomography, the industrial field, for example, nondestructive inspection, the security field, for example, inspection of personal belongings, and the scientific field, for example, high energy physics.

Among the scintillators are various types of scintillators available according to the types of radiation and the purposes of use. They include inorganic crystals such as $Bi_4Ge_3O_{12}$, $Gd_2SiO_5$:Ce, $PbWO_4$, CsI, and KI, organic crystals such as anthracene, fluorescent substance-containing polymers such as polystyrene and polyvinyltoluene, and special scintillators including liquid scintillators and gas scintillators. When neutron rays are the object of detection, they are generally detected by utilization of a nuclear reaction which converts neutrons promptly into charged particles having energy, since neutrons have strong power to pass through a substance without performing any interaction in the substance.

Typical characteristics demanded of the scintillator include a large quantity of light (light emission intensity), high stopping power for radiation (detection efficiency), and fast decay of fluorescence (fast response). The scintillator designed to detect neutrons, in particular, needs to have the ability to discriminate between neutrons and the γ rays, because a radiation capture reaction tends to occur between neutrons and the absorbing substance, generating γ rays.

A $^6$Li glass scintillator has so far been used as a scintillator for neutron detection. However, its manufacturing process has been very difficult and thus expensive, and there has been a limit to its upsizing. A scintillator for neutron detection, comprising a fluoride crystal, on the other hand, is advantageous in that an upsized scintillator can be produced at a low cost. For example, a scintillator comprising a lithium barium fluoride crystal has been proposed. However, this scintillator has high sensitivity to γ rays, and its background noise attributed to γ rays has been great. Thus, there has been need to take a complicated technique in using it as a scintillator for neutron detection (see Non-Patent Document 1).

In connection with such problems, the inventors have attempted to apply cerium-doped $LiCaAlF_6$ crystals as scintillators for neutron detection. In making these attempts, they have performed the evaluation, etc. of scintillation characteristics under simulated conditions involving ultraviolet excited light emission or α ray irradiation. These crystals cause light emission by mechanisms in two stages, namely, generation of α rays which are secondary radiation due to the reaction of incident neutrons with $^6$Li (primary mechanism), and light emission of ultraviolet rays at about 290 nm ascribed to the electron transition of Ce ions by the α rays (secondary mechanism). However, the evaluations made so far have not involved irradiation with neutron rays per se. This means that the primary mechanism has not been evaluated, namely, that the efficiency of α ray generation has not been evaluated at all. As seen from these facts, the true characteristics of the crystals as scintillators for neutron detection have not been evaluated. As a result, the optimal composition of the scintillator for neutron detection has not been specified yet (see Non-Patent Document 2). The $^6$Li content (to be described later) in the crystals used in the above-mentioned publicly known technologies has only been of the order of 0.73 atom/nm$^3$, and the inventors themselves have confirmed that such a content results in the insufficient efficiency of neutron detection.

Thus, an ideal scintillator for neutron detection which fulfills all the characteristics is not existent at the present time. In the present invention, a material comprising a substance which absorbs the incident neutrons to emit fluorescence is called a scintillator for neutron detection.

Non-Patent Document 1: C. W. E. van Eijik et al., "LiBaF$_3$, a thermal neutron scintillator with optimal n-gamma discrimination", Nuclear Instruments and Methods in Physics Research A 374 (1996) 197-201.

Non-Patent Document 2: Kentaro Fukuda, Kenji Aoki, Akira Yoshikawa and Tsuguo Fukuda, Abstracts of Lectures at the 66th Congress of the Japan Society of Applied Physics, No. 1, 211 (2005)

DISCLOSURE OF THE INVENTION

Problems to be Solved by the Invention

The present invention provides a scintillator for neutron detection which has high sensitivity to neutron rays, is reduced in background noise attributed to γ rays, that is, has low sensitivity to γ rays, and is thus preferably adopted in a scintillation detector for neutrons.

The inventors have prepared various metal fluoride crystals, and have evaluated their performance as scintillators for neutron detection by neutron irradiation experiments. As a result, the inventors have found that metal fluoride crystals having a $^6$Li content and an effective atomic number in specific ranges can become high performance scintillators for neutron detection which have high sensitivity to neutron rays, and are reduced in a background noise attributed to γ rays. This finding has led the inventors to accomplish the present invention.

Means for Solving the Problems

According to the present invention, there is provided a scintillator for neutron detection, comprising a metal fluoride crystal containing lithium, a metallic element having a valence of 2 or higher, and fluorine as constituent elements, the metal fluoride crystal containing 1.1 to 20 atoms per unit volume (atoms/nm$^3$) of $^6$Li, having an effective atomic number of 10 to 40, and containing a lanthanoid.

In the scintillator for neutron detection, the following features are preferred:

(1) The scintillator contains 2.9 to 20 atoms per unit volume (atoms/nm$^3$) of $^6$Li, and/or (2) The effective atomic number is 10 to 30, and/or (3) The lanthanoid is cerium, praseodymium, or europium.

According to the present invention, there is also provided a neutron detector comprising the scintillator for neutron detection, and a photodetector which detects light emitted from the scintillator for neutron detection and converts the light into an electrical signal.

In the neutron detector, the photodetector is preferably a photomultiplier tube.

According to the present invention, there is further provided a method for producing a metal fluoride crystal for a scintillator for neutron detection, comprising: melting a material mixture, composed of lithium fluoride having a $^6$Li isotopic ratio of 20% or more, a fluoride of a metallic element having a valence of 2 or higher, and a fluoride of a lanthanoid, to form a material melt; and growing a single crystal from the material melt by the melt growth method.

The above method for production is preferably adopted for the production of a lanthanoid-containing lithium calcium aluminum fluoride (M:LiCaAlF$_6$ (M is a lanthanoid) crystal or a lanthanoid-containing lithium yttrium fluoride (M:LiYF$_4$ (M is a lanthanoid) crystal.

Effects of the Invention

The scintillator of the present invention has high sensitivity to neutron rays, and is able to suppress background noise attributed to γ rays. Moreover, the scintillator is highly transparent for the emitted light (scintillation light) to pass. Such a scintillator is useful as a scintillator for neutron detection, and can be used preferably in the industrial field, such as various nondestructive inspections, and the security field, such as inspection of personal belongings.

Description of the Reference Numerals

| | |
|---|---|
| 1 | After-heater |
| 2 | Heater |
| 3 | Heat insulating material |
| 4 | Stage |
| 5 | Crucible |
| 6 | Chamber |
| 7 | High frequency coil |
| 8 | Pulling-down rod |
| 9 | Scintillator for neutron detection |
| 10 | Photodetector |

BEST MODE FOR CARRYING OUT THE INVENTION

The scintillator for neutron detection according to the present invention comprises a metal fluoride crystal containing lithium, a metallic element having a valence of 2 or higher, and fluorine, the metal fluoride crystal also containing a lanthanoid. The metal fluoride crystal is a lithium-containing metal fluoride crystal characterized maximally by having a specific $^6$Li content and a specific effective atomic number, and containing a lanthanoid. In the present invention, the term "metal fluoride crystal" refers to a crystal containing all of the above-mentioned components, whereas the term "matrix metal fluoride crystal" refers to a crystal comprising components other than the lanthanoid.

In the present invention, the above-mentioned $^6$Li content refers to the number of Li elements contained in 1 nm$^3$ of the scintillator. Incident neutrons cause a nuclear reaction with this $^6$Li to generate α rays which are secondary radiation. Thus, the $^6$Li content affects sensitivity to neutron rays, and the higher the $^6$Li content, the higher the sensitivity to neutron rays becomes.

Such $^6$Li content can be adjusted, as appropriate, by selecting the chemical composition of the scintillator for neutron detection and adjusting the percentage of $^6$Li contained (referred to as $^6$Li isotopic ratio) in lithium fluoride (LiF) or the like used as the lithium material. The $^6$Li isotopic ratio refers to the elemental ratio of the $^6$Li isotope to all lithium elements, and is about 7.6% in natural lithium. The method of adjusting the $^6$Li isotopic ratio is, for example, a method comprising using a general-purpose material having a natural isotopic ratio as a starting material, and concentrating the $^6$Li isotope to the desired $^6$Li isotopic ratio; or a method which makes preparations for a concentrated material having $^6$Li concentrated beforehand to a ratio equal to or higher than the desired $^6$Li isotopic ratio, and mixing the concentrated material and the above general-purpose material for adjustment.

In the present invention, the aforementioned $^6$Li content needs to be set at 1.1 atoms/nm$^3$ or more. By setting the $^6$Li content at 1.1 atoms/nm$^3$ or more, sufficient sensitivity to neutron rays is provided. This content can be achieved by selecting the type of a metal fluoride crystal, without using the lithium material with a specially increased $^6$Li isotopic ratio. Thus, a scintillator for neutron detection can be provided at a low cost. To increase the sensitivity to neutron rays further, it is particularly preferred that the $^6$Li content be set at 2.9 atoms/nm$^3$ or more. This sensitivity to neutrons can be represented by a peak area in a pulse-height spectrum shown in FIG. 1. This area (cps) is called a neutron detection efficiency. The larger its value, the higher the sensitivity to neutrons is.

On the other hand, the upper limit of the $^6$Li content is set at 20 atoms/nm$^3$. In order to achieve a $^6$Li content in excess of 20 atoms/nm$^3$, there is need to use a large amount of a special lithium material having $^6$Li concentrated beforehand to a high level. This results in an extremely high cost of production. Moreover, the selection of the type of the metal fluoride crystal is limited markedly.

The above $^6$Li content can be determined by finding, beforehand, the density of the scintillator, the mass fraction of the Li elements in the scintillator, and the $^6$Li isotopic ratio of the lithium material, and substituting these parameters into the following Equation [1]:

$$^6\text{Li content} = \rho \times W \times C/(700-C) \times A \times 10^{-23} \quad [1]$$

where ρ represents the density of the scintillator [g/cm$^3$], W represents the mass fraction of the Li elements in the scintillator [mass %], C represents the $^6$Li isotopic ratio of the material [%], and A represents Avogadro's number [6.02× 10$^{23}$].

The matrix metal fluoride crystal in the present invention needs to contain a metallic element having a valence of 2 or higher as a constituent element. As will be described later, a lanthanoid replaces a part of the metallic element having a valence of 2 or higher in the crystal, and is thereby incorporated into the metal fluoride crystal. The metallic element having a valence of 2 or higher may be a metallic element which can form a fluoride crystal containing Li. To render the effective atomic number small, a typical metallic element or a transition metallic element having an atomic number of 56 or lower, especially, 40 or lower, is preferred. Representative examples are metallic elements having a valence of 2, such as magnesium, calcium, strontium and barium, metallic elements having a valence of 3, such as aluminum, scandium and yttrium, and metallic elements having a valence of 4, such as zirconium. The matrix metal fluoride crystal containing a metallic element selected from the metallic elements having a valence of 2 to 4 is adopted preferably from the viewpoint of ease of production. One or two or more of the metallic elements having a valence of 2 or higher may be contained in the matrix metal fluoride crystal. The matrix metal fluoride crystal may also contain a monovalent metallic element other than lithium, such as sodium, potassium or rubidium.

The scintillator for neutron detection according to the present invention needs to have an effective atomic number of 10 to 40 which is defined by Equation [2] indicated below. By setting the effective atomic number at 40 or lower, it is possible to constitute a scintillator for neutron detection which can sufficiently reduce a background noise ascribed to γ rays, and can measure neutron rays without undergoing disturbance by γ rays. Even when the effective atomic number is set at less than 10, on the other hand, the noise reducing effect is not improved very greatly, and merely the selection of the type of the metal fluoride crystal is markedly restricted. This is not preferred. It is particularly preferred for the effective atomic number to be 10 to 30, from the aspect of the background noise reducing effect.

In the present invention, the effective atomic number is an indicator defined by Equation [2] shown below. The effective atomic number affects the background noise attributed to γ rays, and a phenomenon is observed in which the smaller the effective atomic number, the more greatly the background noise is reduced.

$$\text{Effective atomic number} = (\Sigma W_i Z_i^4)^{1/4} \qquad [2]$$

where $W_i$ and $Z_i$, respectively, represent the mass fraction and the atomic number of the ith element among the elements constituting the scintillator.

The effective atomic number is specific to the chemical composition of the scintillator for neutron detection, as is clear from the above-mentioned Equation [2]. By selecting the type of the metal fluoride crystal as well as the type and content of a lanthanoid incorporated into the metal fluoride crystal, therefore, the effective atomic number can be adjusted as appropriate.

The scintillator for neutron detection according to the present invention is characterized by containing a lanthanoid as a luminescence center. The lanthanoid is not limited, and cerium (Ce), praseodymium (Pr), neodymium (Nd), samarium (Sm), europium (Eu), gadolinium (Gd), terbium (Tb), dysprosium (Dy), holmium (Ho), erbium (Er), thulium (Tm) or ytterbium (Yb) can be selected and used, as appropriate, according to the desired light emission wavelength, light emission intensity and light emission lifetime.

When α rays, the aforementioned secondary radiation, hit the scintillator, many electron-hole pairs are formed in the scintillator. When some of the electron-hole pairs recombine via the lanthanoid, light emission takes place. In the case of Ce or Pr, for example, light emission due to 5d-4f transition by way of electron transition from the 5d level to the 4f level occurs. This light emission due to the 5d-4f transition of Ce or Pr occurs in particularly short decay time, so that a scintillator with an excellent fast response can be obtained. With Eu as well, light emission due to 5d-4f transition similarly occurs. However, the light emission due to the 5d-4f transition of $Eu^{2+}$ has the nature that it is long-lived compared with Ce or Pr, while light emission intensity is extremely high.

The content of the lanthanoid incorporated into the metal fluoride crystal is not limited, but its preferred range is 0.005 to 5 mols relative to 100 mols of lithium constituting the metal fluoride crystal. Generally, as the lanthanoid content increases, the light emission intensity is enhanced. If the content is too high, however, the light emission intensity is decreased by concentration quenching. Because the effective atomic number is raised, moreover, the background noise due to γ rays tends to increase.

The lanthanoid contained in the crystal is assumed to be partly existent at the interstitial sites of the crystal lattice, and to be partly present as replacing some of the atoms of the element constituting the crystal lattice, for example, calcium, strontium or yttrium.

When the lanthanoid is incorporated during the manufacturing process for the metal fluoride crystal to be described later, a segregation phenomenon of the lanthanoid in the fluoride crystal may be observed. Even in a case where such a segregation phenomenon is seen, an effective segregation coefficient (k) is determined beforehand, and the content of the lanthanoid in the starting material is adjusted based on Equation [3] indicated below. By so doing, a metal fluoride crystal having the desired lanthanoid content can be easily obtained.

$$C_s = kC_0(1-g)^{k-1} \qquad [3]$$

where $C_s$ represents the content of the lanthanoid (M) in the metal fluoride crystal [mol % (M/Li)], k represents the effective segregation coefficient, $C_0$ represents the content of the lanthanoid (M) in the starting material [mol % (M/Li)], and g represents the solidification fraction.

As the effective segregation coefficient, the value described in the literature (for example, Growth of Ce-doped $LiCaAlF_6$ and $LiSrAlF_6$ single crystals by the Czochralski technique under $CF_4$ atmosphere) may be adopted. If there is no value in the literature, the value can be determined by making measurements in accordance with the method described, for example, in the above document. If the matrix metal fluoride crystal is $LiCaAlF_6$, for example, the effective segregation coefficient of Ce is 0.02. According to the results of experiments conducted by the inventors, when the matrix metal fluoride crystal is $LiCaAlF_6$, the effective segregation coefficients of Pr and Eu are each 0.02. When the matrix metal fluoride crystal is $LiYF_4$, the effective segregation coefficient of Ce is 1.

Studies by the inventors show that a lanthanoid relying on 5d-4f transition for light emission is preferred in uses requiring a fast response (time resolution). The scintillator for neutron detection which contains Ce or Pr, in particular, has a light emission decay constant of generally 20 to 50 ns, showing an excellent fast response. Thus, this scintillator is adopted preferably in the detection of neutron rays in the atomic energy field, for example. By selecting Eu as the lanthanoid, on the other hand, a neutron scintillator having a maximum light emission intensity can be obtained. Such a scintillator can be used preferably in uses which do not require a fast response, for example, the field of imaging of transmitted radiation upon irradiation with neutron rays.

The matrix metal fluoride crystal of the present invention is not limited, if it is a crystal which can fulfill the aforementioned $^6Li$ content and effective atomic number and can contain the lanthanoid as ions. Matrix metal fluoride crystals, such as lithium calcium aluminum fluoride crystals ($LiCaAlF_6$), lithium strontium aluminum fluoride ($LiSrAlF_6$), and lithium yttrium fluoride ($LiYF_4$), are the most preferred, in view of the facts that they can achieve both of a particularly high $^6$Li content and a particularly low effective atomic number and they are relatively easily producible, high quality crystals.

The metal fluoride crystal of the present invention is a single crystal or a polycrystalline material, but a single crystal is preferred for the following reasons: By using a single crystal, a neutron scintillator with high light emission intensity can be produced, without involving a loss due to nonradiative transition attributed to a lattice defect or the dissipation of scintillation light at the grain boundary. In the case of the single crystal, the respective crystals have their characteristic crystal systems, and LiCaAlF$_6$ and LiSrAlF$_6$ are hexagonal systems, while LiYF$_4$ is a tetragonal system.

The lanthanoid-containing metal fluoride crystal used in the present invention is a colorless or slightly colored transparent crystal, and is highly transparent to scintillation light. This crystal has satisfactory chemical stability and, when it is used in an ordinary manner, its performance does not deteriorate over a short term. Furthermore, its mechanical strength and processability are satisfactory, and it can be easily processed into a desired shape and used.

The method of producing the metal fluoride crystal is not limited, and this crystal can be produced by a publicly known manufacturing method. Preferably, the crystal is produced by the micro-pulling-down method or the Czochralski method. A metal fluoride crystal excellent in quality, such as transparency, can be produced by adopting the micro-pulling-down method or the Czochralski method. According to the micro-pulling-down method, in particular, the crystal can be directly produced in a specific shape, and in a short time. According to the Czochralski method, on the other hand, a large crystal several inches in diameter can be produced at a low cost.

An explanation will be offered for a general method in producing a metal fluoride crystal by the micro-pulling-down method.

Figure 3:
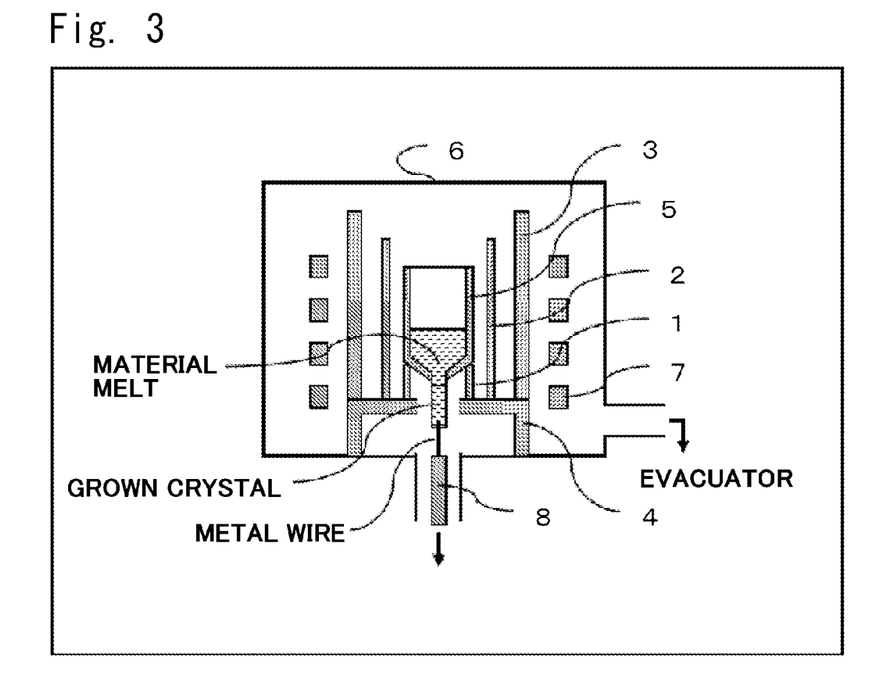
FIG. 3 is a schematic view of a crystal manufacturing apparatus by the micro-pulling-down method which is used for the scintillator of the present invention.

Predetermined amounts of materials are charged into a crucible 5 provided with a hole at its bottom. The shape of the hole provided in the bottom of the crucible is not limited, but is preferably a cylindrical shape having a diameter of 0.5 to 5 mm and a length of 0 to 2 mm.

The purity of the materials is not limited, but is preferably 99.99% or higher. By using such a high-purity material mixture, the purity of the resulting metal fluoride crystal can be increased, and the characteristics such as light emission intensity are improved. Such materials used may be powdery or particulate materials, or may be used after being sintered or melted and solidified beforehand.

Metal fluorides, such as lithium fluoride (LiF), calcium fluoride (CaF$_2$), aluminum fluoride (AlF$_3$), yttrium fluoride (YF$_3$), cerium fluoride (CeF$_3$), praseodymium fluoride (PrF$_3$), and europium fluoride (EuF$_3$), are used as the materials.

In producing the metal fluoride crystal by the melt growth method such as the micro-pulling-down method or the Czochralski method, the mixing ratio for these materials is preferably determined based on phase equilibrium. That is, if the intended metal fluoride crystal is congruently melted, it is preferred to render the mixing ratio a stoichiometric ratio. If the intended metal fluoride crystal is incongruently melted, it is preferred to adjust the mixing ratio so that the intended metal fluoride crystal becomes a primary crystal. If a segregation phenomenon is observed during incorporation of the lanthanoid, it is preferred to determine the mixing ratio of the materials with the use of the effective segregation coefficient, as stated above. The phase equilibrium of the desired metal fluoride crystal may be determined beforehand by experiments using the thermal analysis method, or may be referred to the exiting literature or database.

Then, the crucible 5 charged with the above materials, an after-heater 1, a heater 2, a heat insulating material 3, and a stage 4 are set as shown in FIG. 3. The interior of a chamber 6 is evacuated up to $1.0 \times 10^{-3}$ Pa or lower using an evacuator, and then an inert gas such as high purity argon is introduced into the chamber for gas exchange. The pressure inside the chamber after gas exchange is not limited, but is generally atmospheric pressure. The gas exchange operation can remove water adhering to the materials or the interior of the chamber, and can prevent the deterioration of the crystal due to such water.

To avoid the adverse influence of water which cannot be removed even by the gas exchange operation, it is preferred to use a solid scavenger such as zinc fluoride or a gaseous scavenger such as tetrafluoromethane. If the solid scavenger is used, a method of mixing it into the materials beforehand is preferred. If the gaseous scavenger is used, a method of mixing it with the above inert gas and introducing the mixture into the chamber is preferred.

After the gas exchange operation is performed, the materials are heated by a high frequency coil 7 and the heater 2 until they are melted. The heating method is not limited, and a resistance heating type carbon heater, for example, can be used as appropriate in place of the high frequency coil-heater configuration, for example. Then, a melt of the molten materials is pulled out through the hole of the crucible bottom to start the production of a crystal. With the output of the high frequency coil being adjusted as appropriate, the melt is continuously pulled down at a constant pulling-down speed, whereby a desired metal fluoride crystal can be obtained. The pulling-down speed is not limited, but is preferably in the range of 0.5 to 50 mm/hr.

With the metal fluoride crystal of the present invention, an annealing operation may be performed after the production of the crystal by the above-described micro-pulling down method or the like, for the purpose of eliminating a crystal defect due to a deficiency in the fluorine atoms or thermal strain.

The resulting metal fluoride crystal has satisfactory processability, and is easy to process into a desired shape for use. During processing, a cutter such as a blade saw or a wire saw, a grinder, or a polishing apparatus, which is publicly known, can be used without any limitations.

Figure 4:
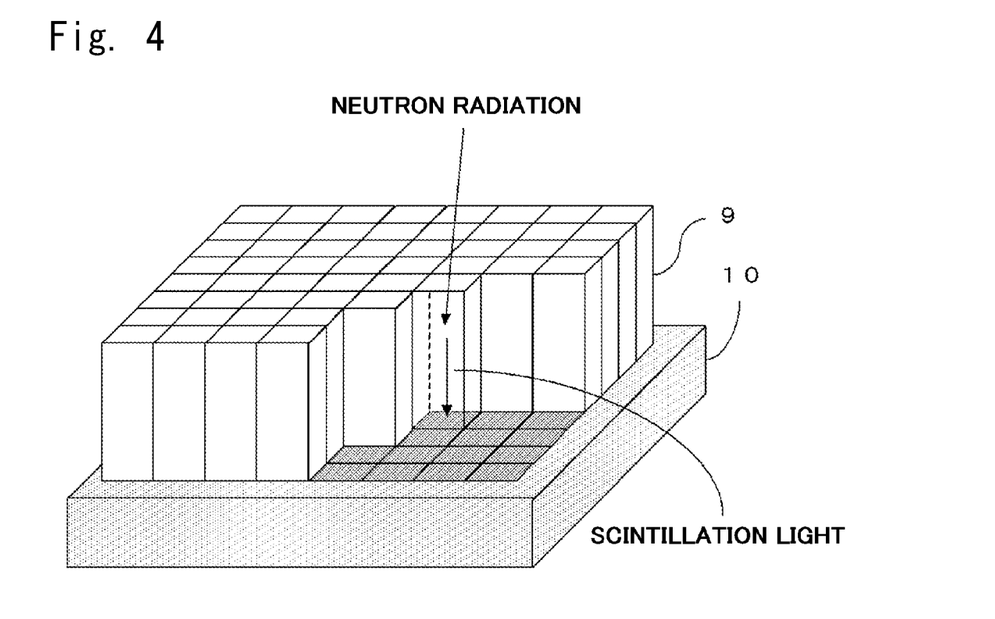
FIG. 4 is a schematic view showing a neutron detector according to the present invention.

The scintillator for neutron detection, which comprises the metal fluoride crystal of the present invention, can be made into a highly efficient neutron detector in combination with a photodetector such as a photomultiplier tube. That is, light (scintillation light) emitted from a scintillator (9) for neutron detection upon irradiation with neutron rays is converted into an electrical signal by a photodetector (10), whereby the presence or absence of neutron rays can be found, and the intensity of the neutron rays can be determined from the electrical signal. A typical wavelength of the scintillation light emitted from the scintillator of the present invention is 250 to 400 nm. A photomultiplier tube, a silicon photodiode, or the like can be used preferably as the photodetector which can detect light in this region.

A practical example is a method which comprises adhering a block of the metal fluoride crystal to a photo-cathode window of a photomultiplier tube by an optical grease or the like, supplying a high voltage to the photomultiplier tube, and observing an electrical signal outputted from the photomultiplier tube. An amplifier and a multichannel pulse height analyzer may be used to determine the intensity of neutron rays, etc. from the electrical signal.

Further, a position sensitive photodetector comprising an array of detecting units each having a sensitive area of several millimeters square is used as the photodetector, and the metal fluoride crystal of a size comparable to that of the sensitive area is joined to each of the detecting units of the position sensitive photodetector. By this procedure, a position sensitive neutron detector can be constructed.

EXAMPLES

The present invention will be described concretely with reference to its Examples, but the present invention is in no way limited by these Examples.

Example 1

A $LiCaAlF_6$ crystal containing Ce as a lanthanoid was produced using a crystal manufacturing apparatus by the micro-pulling-down method as shown in FIG. 3. Lithium fluoride, calcium fluoride, aluminum fluoride and cerium fluoride each having purity of 99.99% or higher were used as materials. The ti isotopic ratio of the lithium fluoride was 50%. The after-heater 1, the heater 2, the heat insulating material 3, the stage 4, and the crucible 5 made of high purity carbon were used, and the shape of the hole at the bottom of the crucible was a cylindrical shape of 2.2 mm in diameter and 0.5 mm in length.

First, 68 mg of lithium fluoride, 203 mg of calcium fluoride, 219 mg of aluminum fluoride, and 10 mg of cerium fluoride were weighed, and thoroughly mixed to obtain a material mixture, which was charged into the crucible 5. The crucible 5 charged with the materials was placed on the after-heater 1, and the heater 2 and the heat insulating material 3 were sequentially placed around them. Then, the interior of the chamber 6 was evacuated to $5.0 \times 10^{-4}$ Pa by an evacuator comprising an oil-sealed rotary vacuum pump and an oil diffusion pump. Then, a tetrafluoromethane-argon gas mixture was introduced to atmospheric pressure into the chamber 6 for gas exchange.

A high frequency current was applied to the high frequency coil 7 to heat the materials by induction heating and melt them. A W—Re wire at the top of a pulling-down rod 8 was inserted into the above hole of the bottom of the crucible 5 to pull down a melt of the materials from the hole and start crystallization. Adjusting the output power of the high frequency properly, the melt was pulled down continuously for 15 hours at a rate of 3 mm/hr to obtain a $LiCaAlF_6$ crystal containing cerium as a lanthanoid. The crystal was a high quality crystal 2.2 mm in diameter and 45 mm in length and free of turbidity or cracks.

This metal fluoride crystal was cut to a length of 15 mm by a wire saw provided with a diamond wire, then ground and mirror-polished to be processed into a shape having a length of 15 mm, a width of 2 mm and a thickness of 1 mm, whereby the scintillator for neutron detection according to the present invention was obtained. The density of the scintillator, the mass fraction of the Li elements in the scintillator, and the $^6Li$ isotopic ratio in the lithium material were 3.0 g/cm³, 3.7 mass %, and 50%, respectively. Thus, the $^6Li$ content was found to be 5.1 atoms/nm³ from the Equation [1]. The composition of the neutron scintillator was $Ce_{0.0004}LiCaAlF_6$, and the effective atomic number calculated from the Equation [2] using this composition was 15.

The performance of the resulting scintillator as a scintillator for neutron detection was evaluated by the following method:

The scintillator for neutron detection was adhered to the photo-cathode window of a photomultiplier tube (H7416, produced by HAMAMATSU PHOTONICS K.K.) by an optical grease, and then the scintillator and the photomultiplier tube were shielded with a light blocking sheet so that light from the outside would not enter.

A $^{252}Cf$ neutron source having radioactivity of 40 MBq was installed at 110 mm away from the scintillator, and the scintillator was irradiated with neutron rays. Then, in order to measure scintillation light emitted from the scintillator, scintillation light was converted into an electrical signal via the photomultiplier tube to which a high voltage of 1000 V was supplied. The electrical signal from the photomultiplier tube is a pulsed signal reflecting the scintillation light. The height of the pulse represents the intensity of the scintillation light, and the shape of the pulse shows a decay curve based on the decay constant of the scintillation light. The electrical signals outputted from the photomultiplier tube were shaped and amplified by a shaping amplifier, and then inputted into a multichannel pulse-height analyzer for analysis, whereby a pulse-height spectrum was prepared.

Figure 1:
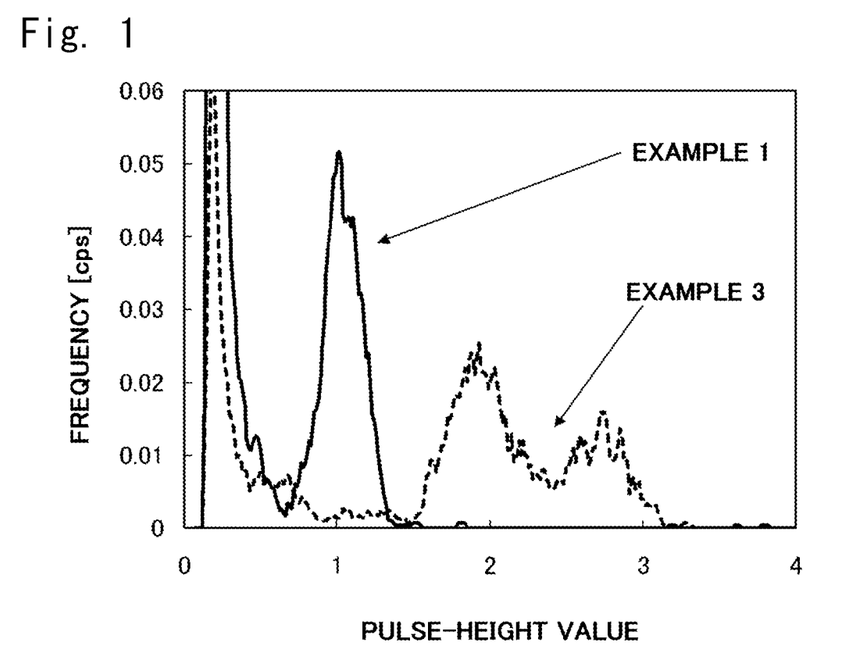
FIG. 1 is a pulse-height spectrum by scintillators for neutron detection according to the present invention.

The prepared pulse-height spectrum is shown in FIG. 1. The abscissa of the pulse-height spectrum represents the pulse-height value of the electrical signal, namely, the intensity of the scintillation light. Here, the pulse-height value is expressed as a relative value, taking the peak value of this spectrum as 1. The ordinate represents the frequency of the electrical signal for each pulse-height value, which is indicated as counts per second (cps). In the pulse-height spectrum, a clear peak due to scintillation light was observed in the region of the pulse-height value of 0.7 to 1.3. This peak is sufficiently separated from noises seen at a pulse-height value of 0.7 or lower, showing that the neutron scintillator of the present invention has sufficient light emission intensity.

The neutron detection efficiency expressed as the peak area in the pulse-height spectrum was 1.3 cps, showing that the neutron scintillator of the present invention has excellent sensitivity to neutrons. Further, the baseline of the pulse-height spectrum was constant in the vicinity of 0 cps, showing that the influence of a background noise resulting from γ rays is negligible.

The electrical signals outputted from the above photomultiplier tube were inputted into an oscilloscope (TDS3052B, produced by Tektronix, Inc.) for analysis of the pulse shape, whereby the decay constant of light emission from the scintillator for neutron detection according to the present invention was determined. The decay constant obtained was 24 ns, showing that the scintillator for neutron detection of the present invention has excellent time response characteristics.

Examples 2 to 5

The metal fluoride crystals of the present invention were obtained in the same manner as in Example 1, except that the types and amounts of the materials were as shown in Table 1. In Examples 1, 3 and 4, lithium fluoride with a $^6Li$ isotopic ratio of 50% was used. In Example 2, lithium fluoride with a $^6Li$ isotopic ratio of 50% and lithium fluoride with a $^6Li$ isotopic ratio of 7.6% were mixed in equal amounts and used. In Example 5, lithium fluoride with a $^6Li$ isotopic ratio of 7.6% was used.

The densities of the resulting metal fluoride crystals, the mass fractions of the Li elements in the metal fluoride crystals, the $^6Li$ isotopic ratios in the lithium materials, and the $^6Li$ contents calculated from these parameters are shown in Table 2. Moreover, the compositions of the metal fluoride crystals and the effective atomic numbers calculated from them are shown in Table 2.

The performance of the scintillators for neutron detection was evaluated by the same method as in Example 1. The pulse-height value was obtained from pulse-height spectrum and expressed as an indicator of the light emission intensity of the scintillator of each Example. The pulse-height value was shown as relative value to Example 1. As an indicator of the neutron detection efficiency, moreover, the peak area in the above pulse-height spectrum was found. Furthermore, the decay constant of light emission was measured in the same manner as in Example 1. The results are shown in Table 3 along with the $^6$Li content and effective atomic number of each scintillator, and the lanthanoid contained in each scintillator.

Example 6

The metal fluoride crystal of the present invention was obtained in the same manner as in Example 1, except that the types and amounts of the materials were as shown in Table 1. In the present Example, lithium fluoride with a $^6$Li isotopic ratio of 50% was used.

The density of the resulting metal fluoride crystal, the mass fraction of the Li elements in the metal fluoride crystal, the $^6$Li isotopic ratio in the lithium material, and the $^6$Li content calculated from these parameters are shown in Table 2. Moreover, the composition of the metal fluoride crystal and the effective atomic number calculated therefrom are shown in Table 2.

Figure 2:
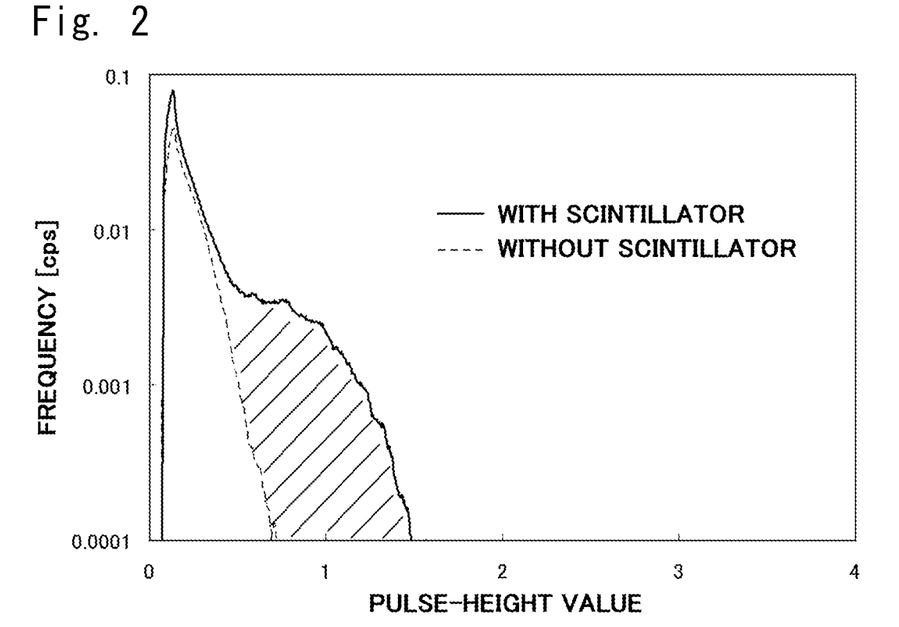
FIG. 2 is a pulse-height spectrum by the scintillator for neutron detection according to the present invention.

The performance of the scintillator for neutron detection was evaluated by the same method as in Example 1, except that R7600 produced by HAMAMATSU PHOTONICS K.K. was used as a photomultiplier tube. Pulse-height spectra prepared are shown in FIG. 2. In these spectra, the solid line represents a spectrum prepared using the scintillator of the present invention, and the dashed line represents a spectrum prepared by irradiating only the photomultiplier tube with radiation, without using the scintillator of the present invention (the pulse-height values of the present Example cannot be directly compared with the pulse-height values of the other Examples and Comparative Examples, because the photomultiplier tubes used are different). In the pulse-height distribution spectra, clear increases in signals due to scintillation light were observed in the region of the pulse-height values of 0.7 to 1.4, as shown in the shaded portion. This demonstrates that the neutron scintillator of the present invention has sufficient light emission intensity.

As an indicator of the neutron detection efficiency, the area of the shaded portion was found in the same manner as in Example 1. Furthermore, the decay constant of light emission was measured in the same manner as in Example 1. The results are shown in Table 3 along with the $^6$Li content and effective atomic number of the scintillator, and the lanthanoid contained in the scintillator.

Comparative Examples 1 and 2

Metal fluoride crystals having a $^6$Li content at a hitherto known level of 0.73 atom/nm$^3$ were produced, and their performance was evaluated, in the same manner as in Example 1, except that the types and amounts of the materials were as shown in Table 1. In these Comparative Examples, lithium fluoride with a $^6$Li isotopic ratio of 7.6% was used as a material. The compositions and effective atomic numbers of the resulting metal fluoride crystals are shown in Table 2, and their evaluation results are shown in Table 3.

The results of the Examples and the Comparative Examples showed that the scintillators for neutron detection according to the present invention had sufficient neutron detection efficiencies for neutrons, and that Examples 1, 2, 3 and 4 with $^6$Li contents of 2 to 20 atoms/nm$^3$ had excellent neutron detection efficiencies. Moreover, Examples 1, 2, 4 and 5 containing a lanthanoid, such as Ce, based on 5d-4f transition as the principle of light emission, showed a decay constant of light emission of 22 to 45 ns, indicating the possession of particularly good time response characteristics. Example 6 containing Pr as a lanthanoid had a decay constant of light emission of 18 ns, showing the possession of even better time response characteristics than Ce. Example 3 having Eu as a lanthanoid was shown to have particularly high light emission intensity. FIG. 1 also shows the pulse-height spectrum of the LiCaAlF$_6$ crystal containing Eu as a lanthanoid which was obtained in Example 3.

TABLE 1

|  | Types/amounts of materials | | | | $^6$Li isotopic ratio of material |
|---|---|---|---|---|---|
| Ex. 1 | LiF 68 mg | CaF$_2$ 203 mg | AlF$_3$ 219 mg | CeF$_3$ 10 mg | 50% |
| Ex. 2 | LiF 68 mg | CaF$_2$ 203 mg | AlF$_3$ 219 mg | CeF$_3$ 10 mg | 29% |
| Comp. Ex. 1 | LiF 68 mg | CaF$_2$ 203 mg | AlF$_3$ 219 mg | CeF$_3$ 10 mg | 7.6% |
| Ex. 3 | LiF 69 mg | CaF$_2$ 204 mg | AlF$_3$ 222 mg | EuF$_3$ 6 mg | 50% |
| Comp. Ex. 2 | LiF 69 mg | CaF$_2$ 204 mg | AlF$_3$ 222 mg | EuF$_3$ 6 mg | 7.6% |
| Ex. 4 | LiF 100 mg | YF$_3$ 562 mg | | CeF$_3$ 4 mg | 50% |
| Ex. 5 | LiF 100 mg | YF$_3$ 562 mg | | CeF$_3$ 4 mg | 8% |
| Ex. 6 | LiF 68 mg | CaF$_2$ 203 mg | AlF$_3$ 219 mg | PrF$_3$ 10 mg | 50% |

TABLE 2

|  | Density [g/cm$^3$] | Mass fraction of Li elements [mass %] | $^6$Li percentage content of material [%] | $^6$Li content [atom/nm$^3$] | Composition | Effective atomic number |
|---|---|---|---|---|---|---|
| Ex. 1 | 3.0 | 3.7 | 50% | 5.1 | Ce$_{0.0004}$LiCaAlF$_6$ | 15 |
| Ex. 2 | 3.0 | 3.7 | 29% | 2.9 | Ce$_{0.0004}$LiCaAlF$_6$ | 15 |
| Comp. Ex. 1 | 3.0 | 3.7 | 7.6% | 0.73 | Ce$_{0.0004}$LiCaAlF$_6$ | 15 |
| Ex. 3 | 3.0 | 3.7 | 50% | 5.1 | Eu$_{0.01}$LiCaAlF$_6$ | 20 |
| Comp. Ex. 2 | 3.0 | 3.7 | 7.6% | 0.73 | Eu$_{0.01}$LiCaAlF$_6$ | 20 |

TABLE 2-continued

|  | Density [g/cm³] | Mass fraction of Li elements [mass %] | $^6$Li percentage content of material [%] | $^6$Li content [atom/nm³] | Composition | Effective atomic number |
|---|---|---|---|---|---|---|
| Ex. 4 | 4.0 | 4.0 | 50% | 7.4 | $Ce_{0.005}LiYF_4$ | 33 |
| Ex. 5 | 4.0 | 4.0 | 8% | 1.1 | $Ce_{0.005}LiYF_4$ | 33 |
| Ex. 6 | 3.0 | 3.7 | 50% | 5.1 | $Pr_{0.0004}LiCaAlF_6$ | 15 |

TABLE 3

|  | $^6$Li content [atom/nm³] | Effective atomic number | Lanthanoid | Light Emission intensity (relative value) | Peak area [cps] | Damping time constant of light emission [ns] |
|---|---|---|---|---|---|---|
| Ex. 1 | 5.1 | 15 | Ce | 0.6-1.3 | 1.3 | 24 |
| Ex. 2 | 2.9 | 15 | Ce | 0.6-1.3 | 0.8 | 26 |
| Comp. Ex. 1 | 0.73 | 15 | Ce | 0.6-1.0 | 0.4 | 22 |
| Ex. 3 | 5.1 | 20 | Eu | 1.6-2.9 | 1.4 | 1100 |
| Comp. Ex. 2 | 0.73 | 20 | Eu | 1.5-2.0 | 0.4 | 1100 |
| Ex. 4 | 7.4 | 33 | Ce | 0.4-0.6 | 1.5 | 44 |
| Ex. 5 | 1.1 | 33 | Ce | 0.4-0.5 | 0.8 | 45 |
| Ex. 6 | 5.1 | 15 | Pr | 0.7-1.4 | 1.3 | 18 |

The invention claimed is:

1. A scintillator for neutron detection, comprising a metal fluoride crystal containing lithium, a metallic element having a valence of 2 or higher, and fluorine as constituent elements, said metal fluoride crystal containing 1.1 to 20 atoms per unit volume (atoms/nm³) of $^6$Li, having an effective atomic number of 10 to 40, and containing a lanthanoid.

2. The scintillator for neutron detection according to claim 1, containing 2.9 to 20 atoms per unit volume (atoms/nm³) of $^6$Li.

3. The scintillator for neutron detection according to claim 1, wherein the effective atomic number is 10 to 30.

4. The scintillator for neutron detection according to claim 1, wherein the lanthanoid is cerium or praseodymium.

5. The scintillator for neutron detection according to claim 1, wherein the lanthanoid is europium.

6. A neutron detector comprising the scintillator for neutron detection according to claim 1, and a photodetector which detects light emitted from the scintillator for neutron detection and converts the light into an electrical signal.

7. The neutron detector according to claim 6, wherein the photodetector is a photomultiplier tube.

* * * * *